No. 625,131. Patented May 16, 1899.
G. A. ABBOTT.
FILTER.
(Application filed Jan. 12, 1899.)

(No Model.)

Witnesses:
C. Holloway
W. C. Pinckney

Inventor:
George Alfred Abbott,
By J. E. All Owen,
Attorney.

THE NORRIS PETERS CO., PHOTO-LITHO., WASHINGTON, D. C.

UNITED STATES PATENT OFFICE.

GEORGE ALFRED ABBOTT, OF BURNLEY, VICTORIA.

FILTER.

SPECIFICATION forming part of Letters Patent No. 625,131, dated May 16, 1899.

Application filed January 12, 1899. Serial No. 701,968. (No model.)

*To all whom it may concern:*

Be it known that I, GEORGE ALFRED ABBOTT, a subject of the Queen of Great Britain, and a resident of No. 53 Bendigo street, Burnley, in the Colony of Victoria, have invented a certain new and useful Improved Filter, of which the following is a specification.

The object of this invention is to provide a filter by which water may be freed of its impure properties for drinking or other purposes.

The invention is specially adapted for use as a high-pressure filter, but may be employed also to filter water at normal pressure. I provide means whereby the filtering medium may be scraped and its surface thus kept free of any coating or deposit. The filtering material may further be readily removed and replaced at a small cost.

In order to make my invention clear, I shall refer to the accompanying sheet of drawings, in which—

Figure 1:
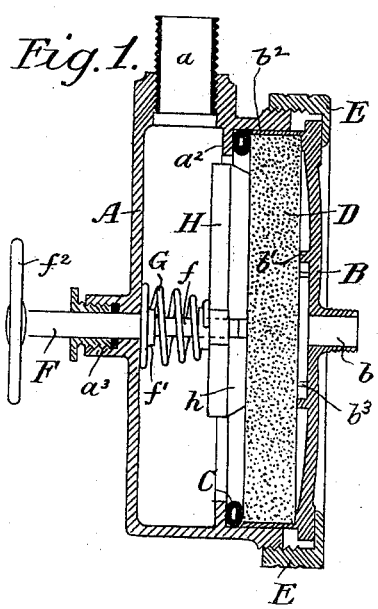
Figure 2:
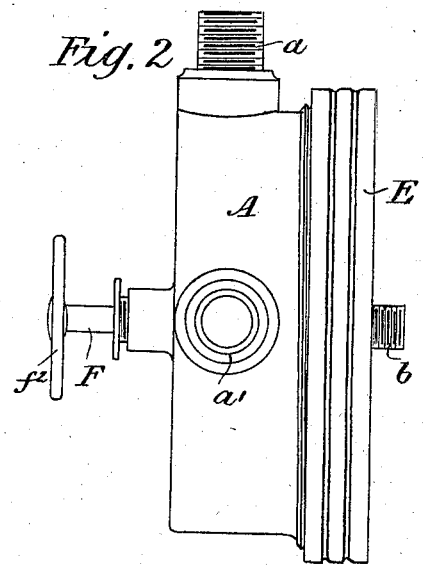
Figure 3:
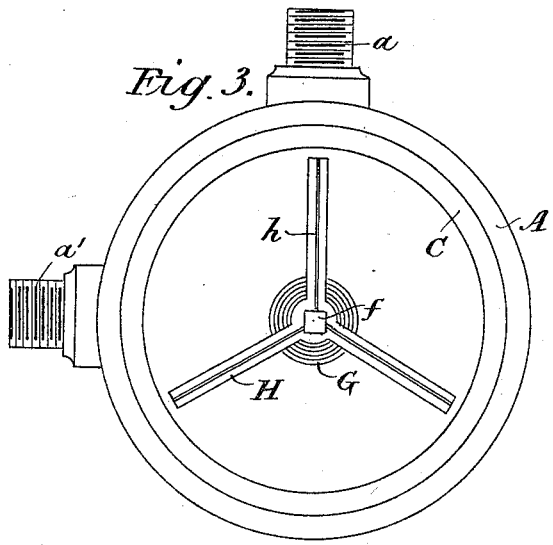
Figure 4:
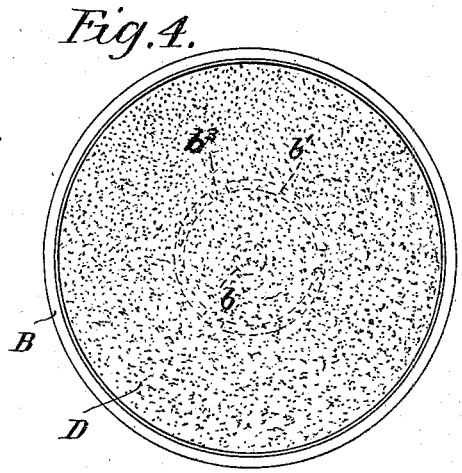

Figure 1 represents a vertical section of the filter; Fig. 2, an external view of same; Fig. 3, a view of the interior, looking onto the scrapers; Fig. 4, a view of the filtering material with its holder.

A represents the casing, which is provided with connection $a$, which will be in communication with the water-supply pipe, and a connection $a'$, which communicates with a tap for ordinary household purposes. This casing has an internal rim $a^2$ and is open at one end.

B represents a cover which closes in the open end of the casing, a ring C of elastic material being provided against the rim $a^2$ to form a close joint between cover and casing. The cover B has a flange $b^2$, which enters the casing and presses against the joint-ring C.

D represents the filtering material in position in the cover. The cover is held hard against the rubber ring C by means of the screw-ring E, which is provided with a milled edge or other convenient means of turning and screwing same upon the casing A. The cover B has an opening $b$, through which the filtered water passes to a reservoir or where required.

F represents a rod or spindle which passes through a suitably-packed gland $a^3$, formed in the casing, and terminates in a square portion $f$. A stop-collar $f'$ is set upon the rod, and a hand-wheel $f^2$ is provided for operating it. Upon the squared end of the rod a bush having scraper-arms H is loosely mounted, such arms having scraper-plates $h$ of any suitable material, preferably metal. A spiral spring G is arranged to encircle the rod and to exert a pressure against the scraper-arms to keep same forward and against the filtering material.

The filtering material aforesaid is composed of fine washed clay and pulverized lignite, compressed and burned into cakes of the required form, the proportion of lignite in the composition being from twenty-five to seventy-five per cent. For a high-pressure filter a small percentage of lignite is employed, but for low pressure and where a more porous material is required a high percentage is employed.

In operation water enters the filter from the water-supply service-pipe at $a$, passes through the filtering material, where it is freed of impurities, and by the outlet $b$ to a reservoir for consumption. The surface of the filtering material is kept in a clean state by means of the scrapers, which may be rotated by operating the hand-wheel $f^2$, and the coating or deposit thus removed from the surface may be let out of the filter by operating the tap at $a'$.

The cover B is provided with a projection-seat $b'$, having openings $b^3$, against which seat the filtering medium rests.

Having now particularly described and ascertained the nature of my said invention and in what manner the same is to be performed, I declare that what I claim is—

1. The combination in a filter of a casing A having a suitable water-inlet, a cover B having an outlet $b$, and a flange $b^2$, means for securing the cover on the casing, filtering material D in said cover, a spring-pressed rotary scraper in the casing and adapted to operate on the front surface of the filtering material, and an exterior handle $f^2$ therefor.

2. The combination in a filter of a casing A having a suitable water-inlet, a cover B having an outlet $b$, and a flange $b^2$, a flanged ring E for securing the cover on the casing, filtering material D in said cover, a spring-pressed rotary scraper in the casing and adapted to operate on the front surface of the filtering material, and an exterior handle $f^2$ therefor.

3. In a filter a casing, a cover B having an outlet $b$, a flange $b^2$, and a projecting seat $b'$, and filtering material D within the cover and resting on said seat $b'$.

Signed at Melbourne, in the Colony of Victoria, Australia, this 2d day of December, 1898.

GEORGE ALFRED ABBOTT.

Witnesses:
C. W. WADE,
A. HARKER.